United States Patent
Sampath

(10) Patent No.: US 8,223,904 B2
(45) Date of Patent: Jul. 17, 2012

(54) MULTIPLE HYPOTHESIS DECODING

(75) Inventor: Hemanth Sampath, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 810 days.

(21) Appl. No.: 11/501,800

(22) Filed: Aug. 8, 2006

(65) Prior Publication Data

US 2007/0060061 A1    Mar. 15, 2007

Related U.S. Application Data

(60) Provisional application No. 60/710,407, filed on Aug. 22, 2005, provisional application No. 60/753,775, filed on Dec. 23, 2005.

(51) Int. Cl.
*H04B 14/06* (2006.01)

(52) U.S. Cl. .................. 375/349; 375/232; 708/323

(58) Field of Classification Search .......... 375/229–230, 375/232, 249, 316, 346–349; 708/300, 316, 708/322–323
See application file for complete search history.

(56) References Cited

U.S. PATENT DOCUMENTS

| | | | | |
|---|---|---|---|---|
| 5,852,630 | A | * | 12/1998 | Langberg et al. ............. 375/219 |
| 6,128,355 | A | * | 10/2000 | Backman et al. ............. 375/347 |
| 6,298,463 | B1 | * | 10/2001 | Bingeman et al. ............ 714/786 |
| 2004/0246927 | A1 | * | 12/2004 | Wei et al. ..................... 370/335 |
| 2005/0195889 | A1 | | 9/2005 | Grant et al. |
| 2006/0072607 | A1 | * | 4/2006 | Kent et al. .................... 370/464 |
| 2006/0072652 | A1 | * | 4/2006 | Kent et al. .................... 375/148 |
| 2006/0072691 | A1 | * | 4/2006 | Kent et al. .................... 375/349 |
| 2006/0209931 | A1 | * | 9/2006 | Moshavi et al. ............... 375/148 |
| 2007/0223563 | A1 | * | 9/2007 | Perlow et al. ................. 375/130 |

FOREIGN PATENT DOCUMENTS

| | | |
|---|---|---|
| JP | 2001251270 A | 9/2001 |
| JP | 2004072566 A | 3/2004 |
| JP | 2004166218 A | 6/2004 |
| JP | 2004179822 A | 6/2004 |
| JP | 2005341317 A | 12/2005 |
| WO | 0018055 A1 | 3/2000 |
| WO | WO03084094 A2 | 10/2003 |
| WO | 2006138621 A2 | 12/2006 |

OTHER PUBLICATIONS

Bin Dong et al., "Sampling-based Near-optimal MIMO Demodulation Algorithms," IEEE Conference on Decision and Control, Maui, HI, Dec. 9, 2003, vol. 1 of 6, Conf. 42, pp. 4214-4219, XP010686641.
International Search Report—PCT/US06/032936—International Search Authority, European Patent Office—Jan. 25, 2007.
Written Opinion—PCT/US06/032936—International Search Authority, European Patent Office—Jan. 25, 2007.
International Preliminary Report on Patentability—PCT/US06/032936—The International Bureau of WIPO, Geneva, Switzerland—Feb. 26, 2008.

* cited by examiner

*Primary Examiner* — David C. Payne
*Assistant Examiner* — James M Perez
(74) *Attorney, Agent, or Firm* — Stanton Braden

(57) ABSTRACT

A multiple-input receiver for processing one or more communication signals is disclosed. The receiver includes a first and second demodulators, a decoder and decision logic. The first and second demodulators respectively use a first algorithm and a second algorithm and are both coupled to the receiver. The first algorithm includes interference nulling and is different from the second algorithm. A decoder can be alternatively used with the first or second demodulators to decode one or more signals from the receiver. The decoder produces a decoded signal. The decision logic chooses to use either the first demodulator or the second demodulator to affect the decoded signal.

22 Claims, 10 Drawing Sheets

MULTIPLE HYPOTHESIS DECODING

CLAIM OF PRIORITY UNDER 35 U.S.C. §119

The present application for patent claims priority to Provisional Application No. 60/710,407 entitled "MULTIPLE HYPOTHESIS DECODING TO SUPPORT INTERFERENCE CANCELLATION" filed Aug. 22, 2005, and Provisional Application No. 60/753,775 entitled "MULTIPLE HYPOTHESIS DECODING" filed Dec. 23, 2005, both assigned to the assignee hereof and hereby expressly incorporated by reference herein.

BACKGROUND

The present disclosure relates generally to data or voice communication, and more specifically to communication systems that may experience interference.

Communication systems transport information between two points, for example, wirelessly. An access terminal communicates wirelessly with one or more access terminals to transport data, voice or other information. The term access terminal can be used interchangeably with access point or base station, and the term access terminal can be used interchangeably with wireless communication device, user equipment, handset, or mobile station.

Multiple-access communication systems allow using multiple access terminals with a single base station. Further, multiple base stations using at least some of the same wireless media can be arranged in cells or just randomly dispersed. For example, cellular telephone systems arrange their base stations in cell patterns to allow communication with an access terminal to any of the base stations in a seamless way event when the access terminal may be moving. WIFI™ can be more randomly dispersed and may not allow seamless movement between base stations.

Many communication systems today use multiple antennas to increase performance of wireless communication. Such systems are termed single input, multiple output (SIMO) or multiple input, multiple output (MIMO). Each are characterized by transmission and/or reception using multiple antennas that each receive the transmission. Use of multiple antennas can increase the efficiency of the communication system.

SUMMARY

In one embodiment, the present disclosure provides a multiple-input receiver. The receiver includes a first and second demodulators, a decoder and decision logic. The first and second demodulators respectively use a first algorithm and a second algorithm. The first algorithm includes demodulation with interference nulling, whereas the second algorithm assumes demodulation without interference nulling, for example. The decoder includes decoding portions, where each of the decoding portions can be alternatively used with the first or second demodulators to demodulate one or more signals from the receiver. The decoder produces a decoded signal. The decision logic chooses to use either the first demodulator output or the second demodulator output, as input to the decoded signal.

In another embodiment, the present disclosure provides a method for processing one or more communication signals. One or more communication signals are demodulated using a first algorithm, where the first algorithm includes interference nulling. The one or more communication signals are also demodulated using a second algorithm, which is different from the first algorithm. A decision is made between the first and second algorithms to produce a demodulated signal. The demodulated signal is decoded to produce a decoded signal.

In another embodiment, the present disclosure provides a multiple-input receiver. The multiple-input receiver includes first and second means for demodulating, means for deciding, and means for decoding. The first means demodulates the one or more communication signals using a first algorithm that uses interference nulling. The second means demodulates the one or more communication signals using a second algorithm, which is different from the first algorithm. The means for deciding chooses between the first and second algorithm to produce a demodulated signal. The means for decoding the demodulated signal produces a decoded signal.

The present disclosure also discloses a processor readable medium including instructions thereon that may be used by one or more processors. The instructions include instructions for demodulating one or more communication signals using a first algorithm, where the first algorithm includes interference nulling. Instructions for demodulating the one or more communication signals using a second algorithm, which is different from the first algorithm. Instructions for deciding between the first and second algorithms to produce a demodulated signal and instructions for producing a decoded signal for m the demodulated signal.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

Figure 1:
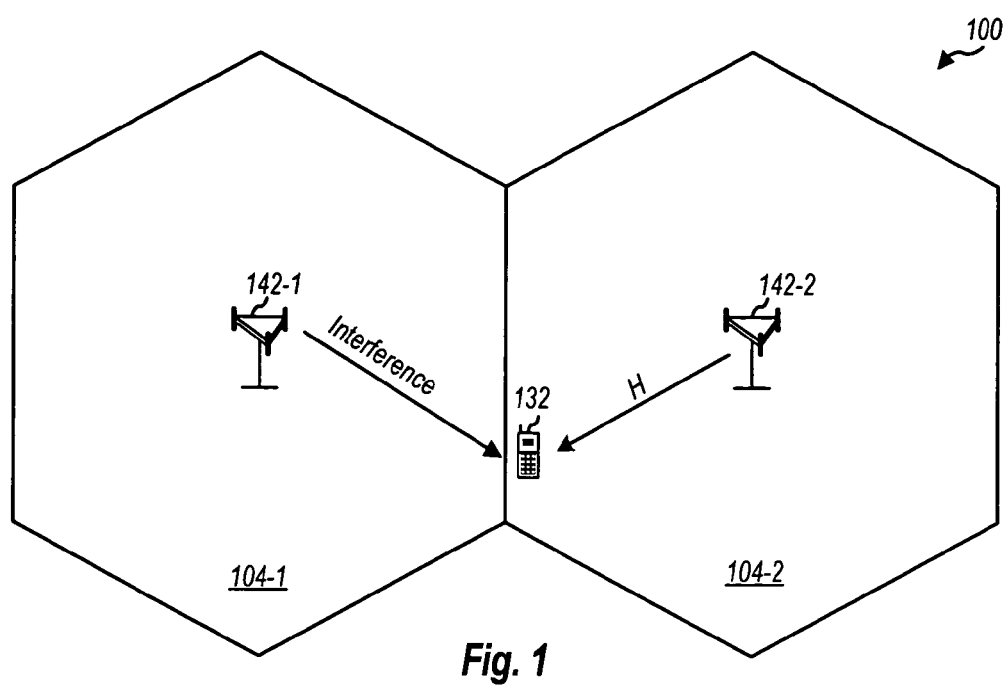
FIG. 1 is a block diagram of an embodiment of a multiple-access communication system.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability or configuration of the disclosure. Rather, the ensuing description of the preferred exemplary embodiment (s) will provide those skilled in the art with an enabling description for implementing a preferred exemplary embodiment. It being understood that various changes may be made in the function and arrangement of elements without departing from the spirit and scope of the disclosure as set forth in the appended claims.

Specific details are given in the following description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. Information, arguments, parameters, data, etc. may be passed, forwarded, or transmitted via any suitable means including memory sharing, message passing, token passing, network transmission, etc.

In one embodiment, the present disclosure provides a multiple-input receiver for processing one or more communication signals. The receiver includes a decoder, which may be implemented as a bank of demodulators and a bank of decoders, and a decision logic that routes the signals from appropriate demodulators to the decoders. Each demodulator can implement a different demodulator algorithm. In one embodiment, the first demodulator algorithm can incorporate interference nulling, whereas the second demodulator algorithm can assume no knowledge of interference. The decoder may include multiple decoders, for example, turbo-decoders. The turbo-decoders can be used to decode symbols from one or more demodulators. The decision logic determines which demodulator outputs need to be routed to turbo-decoders, based upon one or more metrics. These metrics can be for example, the available turbo-decoder resources and/or power consumption considerations.

One embodiment is used for robust demodulation and decoding of small packets. This is explained as follows for one embodiment. Typically, the modem turbo-decoder resources (i.e., the number of turbo-decoders) is sized to decode peak-data rates. However, several applications (e.g., VoIP, control messages) have small packets that need only to use some of the turbo-decoder resources. In this scenario, there are turbo-decoders available for multiple hypothesis decoding. Specifically, symbols from multiple demodulators can be routed to independent turbo-decoders, for multiple-hypothesis decoding. One demodulator can be based on interference nulling, whereas a second demodulator can be based on a vanilla MMSE receiver without interference nulling. If interference estimates are not accurate, the latter algorithm can in-fact perform better than the former algorithm. In this sense, multiple-hypothesis decoder ensures that the optimum demodulator is selected.

In another application where an embodiment is used, the multiple input multiple output (MIMO) transmitter may choose to change the forward link (FL) MIMO rank due to changing channel scenario or packet-sizes. Typically, the transmitter indicates the change of rank using a FL assignment control message. In a fully loaded system, this may not be possible due to lack of FL control resources. To enable the receiver to demodulate the FL transmitted signal, the demodulator may consist of multiple demodulators, where each demodulator can be a minimum mean squared error (MMSE) receiver assuming a different rank e.g., ranks 1, 2, 3, or 4). The signals from each demodulator can be sent to independent decoders, for multiple hypothesis decoding.

Referring initially to FIG. 1, a block diagram of an embodiment of a multiple-access communication system 100 is shown. In this embodiment, cells 104 divide up the geography for multiple base stations 142. One or more access terminals 132 can move between cells and still communicate using the multiple-access communication system 100. Although only two cells 104 are shown in this embodiment, there could be many more cells 104. Some cells could be for base stations not associated with the multiple-access system 100 and use overlapping frequencies, coding and/or other common elements of the transmission media.

In the depicted example, an access terminal is approaching the cell boundary of a second cell 104-2 and is receiving signals from a first cell 104-1. As the access terminal is currently associated with a second base station 142-2, the signal from a first base station 142-1 is considered interference. Interference can reduce the efficiency of the transmission media, among other things.

Interference is a common situation in wireless communication. Interference can occur when two different systems or base stations use the same or overlapping wireless media. In the depicted system 100, two base stations 142 are in range of the same access terminal 132 such that the intended channel, H, receives some interference from an unintended channel, for example from neighboring cell 104-1. Other sources of interference (not shown) could be from systems that use overlapping frequencies, coding and other transmission media components. Similar problems can be encountered at the base station 142, such that interference nulling (IN) can be helpful in both the base station 142 and the access terminal 132.

Interference nulling can give improved performance in most situations where there are multiple receive antennas, but can perform worse where there is a poor estimate of interference statistics. IN uses an estimation of the interference covariance matrix ($R_{nn}$) and/or the received covariance matrix ($R_{yy}$). There can be a loss in performance for a MMSE demodulator when $R_{nn}$ and/or $R_{yy}$ are in-accurate. For example, in the case of single input single output (SISO) transmission, maximum ratio combining (MRC) demodulator without IN can outperform a MMSE demodulator with interference nulling, when the interference statistics are inaccurately estimated.

Figure 2A:
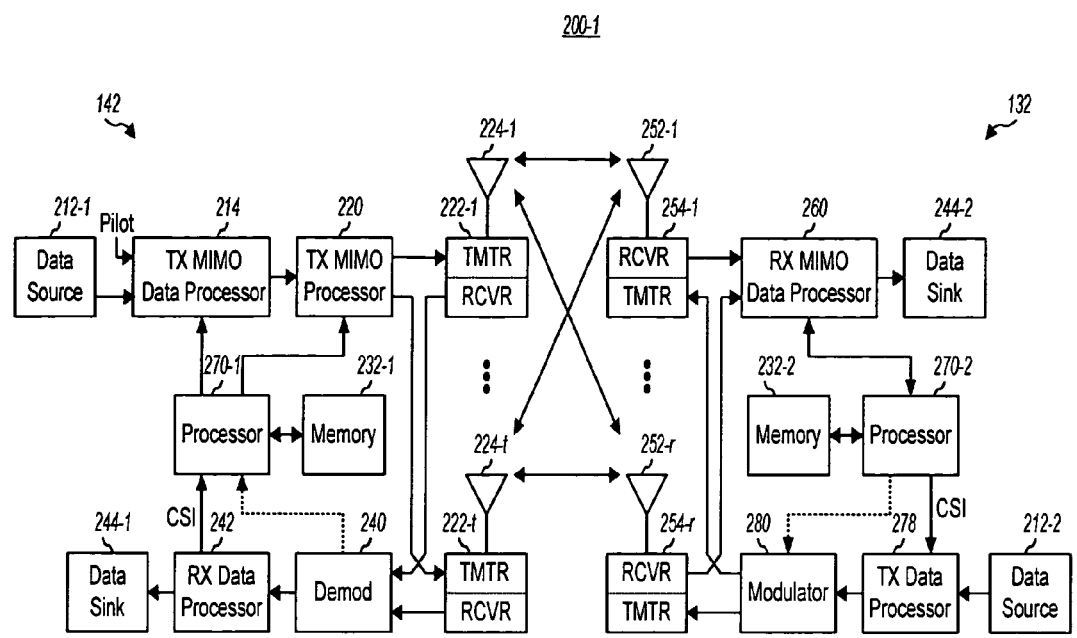
FIGS. 2A and 2B are block diagrams of embodiments of a base station and an access terminal communicating.

With reference to FIG. 2A, a block diagram of an embodiment of a base station 142 and an access terminal 132 having a MIMO configuration is shown. The base station 142 communicates with multiple antennas 224. Similarly, the access terminal 132 communicates with multiple antennas 252. At the base station 142, traffic data for a number of data streams is provided from a data source 212-1 to a transmit (TX) MIMO data processor 214. In one embodiment, each data stream is transmitted over a respective base station antenna 224.

The TX MIMO data processor 214 formats, codes and interleaves the traffic data for each data stream based upon a particular coding scheme selected for that data stream to provide coded data. In some embodiments, the TX MIMO data processor 214 applies beamforming weights to the symbols of the data streams based upon the access terminal 132 to which the symbols are being transmitted and the antenna 224 from which the symbol is being transmitted. Although, this may not be utilized and may be transmission dependent.

The coded data for each data stream may be multiplexed with pilot data using orthogonal frequency division multiplexing (OFDM) techniques. The pilot data is typically a known data pattern that is processed in a known manner and may be used at the access terminal 132 to estimate the channel response. The multiplexed pilot and coded data for each data stream is then modulated (i.e., symbol mapped) based on a particular modulation scheme (e.g., BPSK, QPSK, M-PSK or M-QAM) selected for that data stream to provide modulation symbols. The data rate, coding and modulation for each data stream may be determined by instructions performed on a processor 270-1. In some embodiments, the number of parallel spatial streams may be varied according to the rank information that is transmitted from the access terminal 132.

The modulation symbols for all data streams are then provided to a TX MIMO processor 220 that may further process the modulation symbols (e.g., for OFDM). The TX MIMO processor 220 then provides $N_T$ symbol streams to $N_T$ transmitters/receivers (TMTR/RCVR) 222. Each TMTR 222 receives and processes a respective symbol stream to provide one or more analog signals, and further conditions (e.g., amplifies, filters, upconverts, etc.) the analog signals to provide a modulated signal suitable for transmission of the MIMO channel, H. $N_T$ modulated signals from the $N_T$ TMTRs 222 are then transmitted from $N_T$ antennas 224, respectively.

At the access terminal 132, the transmitted modulated signals are received by $N_R$ antennas 252 and the received signal from each antenna 252 is provided to a respective receiver/transmitter (RCVR/TMTR) 254. Each RCVR 254 conditions (e.g., filters, amplifies, downconverts, etc.) a respective received signal, digitizes the conditioned signal to provide samples, and further processes the samples to provide a corresponding received symbol stream.

An RX MIMO processor 260 then receives and processes the $N_R$ received symbol streams from $N_R$ receivers 254 based upon a particular receiver processing technique to provide the rank number of detected symbol streams. Each detected symbol stream includes symbols that are estimates of the modulation symbols transmitted for the corresponding data stream. The RX MIMO processor 260 then demodulates, deinterleaves and decodes each detected symbol stream to recover the traffic data for the data stream. Demodulating can be done with varying redundant demodulating algorithms to use the best algorithm for a particular set of conditions. The processing of the RX MIMO processor 260 is generally complementary to that performed by the TX MIMO data processor 214 and the TX MIMO processor 220 at the base station 142.

At the access terminal 132, various processing techniques may be used to process the $N_R$ received signals to detect the $N_T$ transmitted symbol streams. The access terminal processing techniques may be grouped into two primary demodulating categories: (i) spatial and space-time receiver processing techniques (i.e., equalization techniques), and (ii) "successive nulling/equalization and interference cancellation" receiver processing techniques (i.e., "successive interference cancellation" or "successive cancellation" receiver processing techniques).

A MIMO channel formed by the $N_T$ transmit and $N_R$ receive antennas may be decomposed into $N_S$ independent channels, with $N_S \leq \min \{N_T, N_R\}$. Each of the $N_S$ independent channels may also be referred to as a spatial subchannel (or a transmission channel) of the MIMO channel and corresponds to a dimension.

If the rank equals one (i.e., a SISO transmission), the access terminal 132 implements both a maximum ratio combining MRC receiver and a MMSE with IN receiver. The soft information generated from both RCVRs 254 is sent to independent turbo-decoders operated by or part of the processor 270. The transmitted bits are obtained from the turbo-decoder upon successful decoding and passing a cyclic redundancy check (CRC) or other validity check. Note that if the interference nulling gains are obtained, then the turbo-decoder corresponding to interference nulling receiver will result in a "earlier decode" and vice-versa. The same concept can be extended to MIMO receivers with/without IN gains.

Other functions are performed by the base station 142 and access terminal 132. A data source 212-2 of the access terminal 132 passes through a TX data processor 278, a modulator 280, and a TMTR 254 before passing over the wireless media to the base station 142. Upon passing the wireless media over the channel matrix, H, the signal passes antennas 224, RCVRs 222, a demodulator 240, and a receiver (RX) data processor 242 to a data sink 244-1. A first path from the access terminal data source 212-2 to the base station data sink 244-1 can use the same multiple-hypothesis decoding as a second path from the base station data source 212-1 to the access terminal data sink 244-2.

Figure 2B:
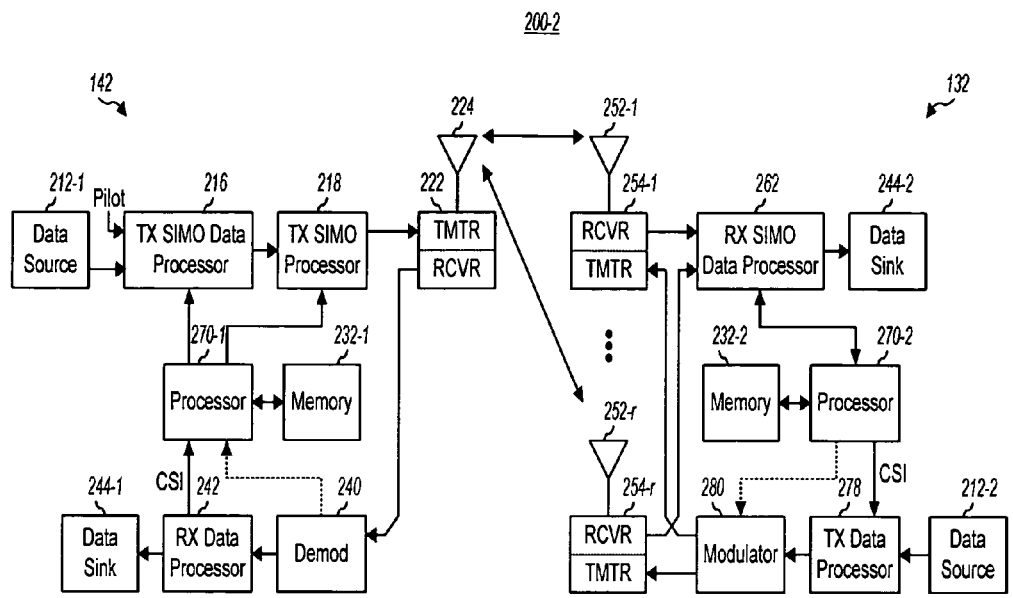

Referring next to FIG. 2B, a block diagram of an embodiment of a base station 142 and an access terminal 132 having a SIMO configuration is shown. The base station in this embodiment uses TX SIMO data processor 216 and a TX SIMO processor 218 to drive a single TMTR 222 and antenna 224. The access terminal 132 has multiple antennas 252 and RCVRs 254 that are processed by a RX SIMO data processor 262. The forward link from the base station 142 to the access terminal 132 has $N_S$ independent channels that are equal in number to the $N_R$ receive antennas 252. The access terminal 132 in this embodiment may be operable in both SIMO and MIMO configurations.

Figure 3A:
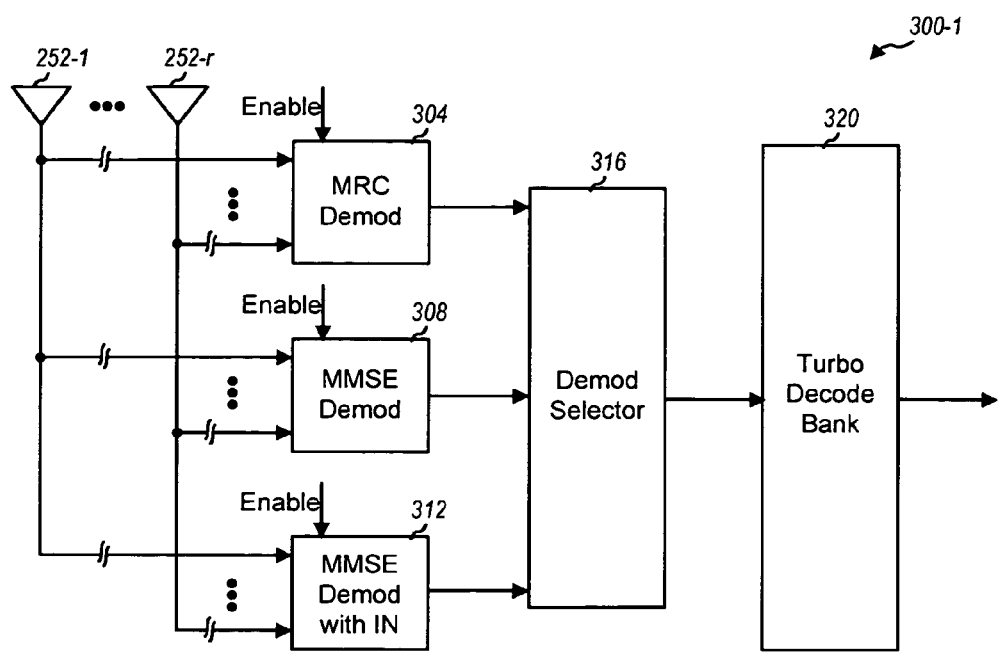
FIGS. 3A, 3B and 3C are block diagrams that show embodiments of a RX MIMO data processor portion that decodes received channels.

With reference to FIG. 3A, a block diagram of an embodiment of a portion 300-1 of the access terminal 132 that shows demodulation and decoding of received channels is depicted. The $N_R$ received signals (corresponding to the receive antennas 252) are passed to three different demodulators 304, 308, 312 in this embodiment, which each demodulate the received signals in parallel. A demodulator selector 316 uses a metric to decide which of the demodulators 304, 308, 312 to pass to a turbo decoder 320, here depicted as a bank of decoders, for decoding.

This embodiment uses MRC and MMSE demodulators 304, 308 that use an equalization technique and a MMSE demodulator with IN 312 that uses a successive cancellation technique. Some embodiments could use only one equalization technique and one successive cancellation technique, but other embodiments could use any number of equalization and successive cancellation techniques. The equalizer function for the MRC demodulator 304, $G=H^*$, and the MMSE demodulator 308, $G=H^*(HH^*+\sigma^2 I)^{-1}$, and the successive cancellation function for MMSE with interference nulling 312, $G=H^*(HH^*+R_{nn})^{-1}$, are all performed in parallel on the same received signals.

The demodulator selector 316 in this embodiment determines the demodulator 304, 308, 312 that is likely to produce the most accurate demodulated signal. A metric is used by the demodulator selector 316 in the selection, for example, power consumption and turbo-decoder resources available. The turbo-decoder resources available is a function of FL data rate—for small data rates more resources are available, and vice-versa for large data rates. After selection, one or more outputs from the demodulators 304, 308, 312 is passed to the turbo decoding 320 for decoding.

The decoding is performed with a turbo decoding 320. Other embodiments could use another convolutional decoder or any decoder once the initial demodulating is performed. The turbo decoder 320 can be used to decode a single signal or multiple signals depending on loading of the turbo decoder 320. For example, the turbo decoder 320 may have additional resources available when frame size is small.

In some cases, another metric can be used to determine before processing by the demodulators 304, 308, 312 the demodulator that is likely to produce the best result. The demodulator 304, 308, 312 unlikely to produce the best result can be disabled and powered-down for those situations where this metric is determined to be accurate. For those situations where the favored demodulator 304, 308, 312 cannot be pre-determined, the demodulator selector 316 makes that determination with all demodulators activated. A mix of culling the demodulators 304, 308, 312 used with the enable signal and choosing from the culled demodulators with the demodulator selector 316 can be done in some embodiments.

Figure 3B:
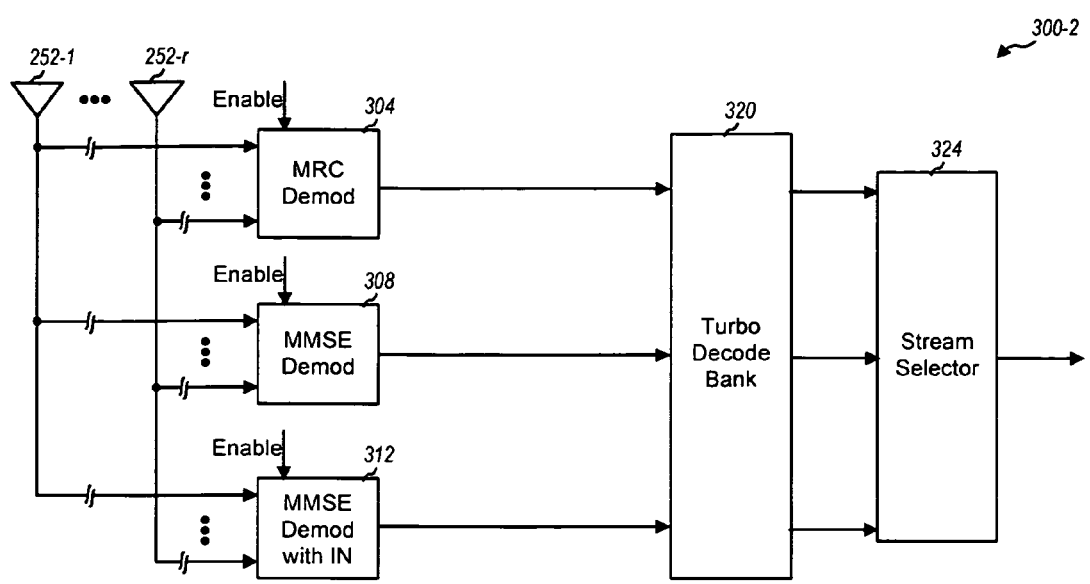

Referring next to FIG. 3B, a block diagram of an embodiment of a portion 300-2 of the access terminal 132 that shows demodulation and decoding of received channels is depicted. In this embodiment, all three demodulators 304, 308, 312 perform their demodulating before passing their results to the turbo decoder 320. Resources are available in the turbo decoder 320 to handle all three streams in parallel.

After decoding in the turbo decoder 320, all three alternatives are presented to a stream selector 324. A validity check of some sort (e.g., CRC, parity, decryption, etc.) is performed in the stream selector to choose which stream is used. Where all streams pass the validity check, a voting algorithm finds the stream that was presented most often and that is chosen by the stream selector 324.

The validity check may be binary for a packet such that one decision is made per packet, but could be performed on sub-packet portions such that portions independently pass or fail the validity check. The packet could be reformulated from portions of one stream or another based upon the piecemeal validity checking.

Figure 3C:
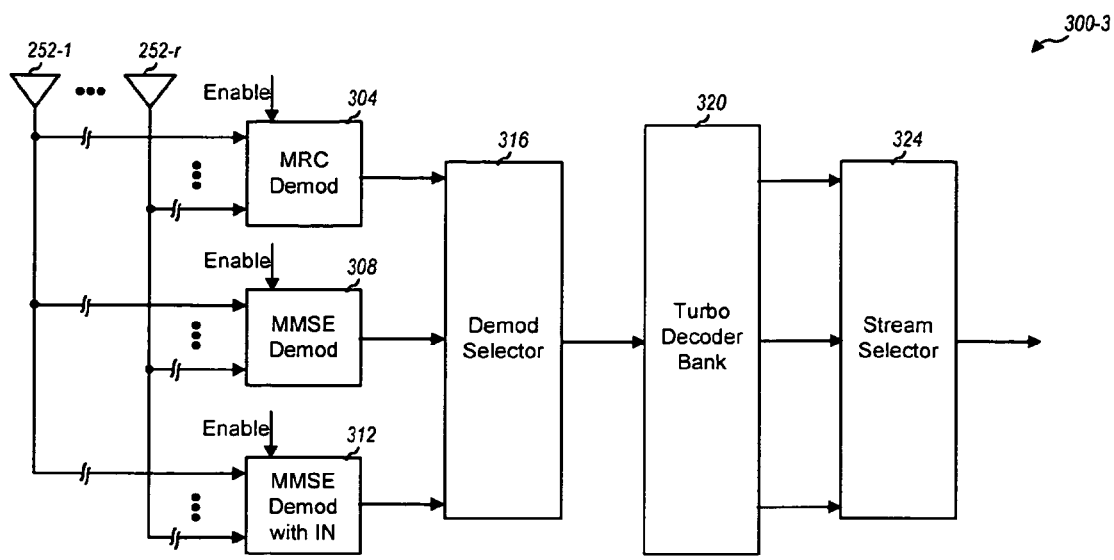

With reference to FIG. 3C, a block diagram of an embodiment of a portion 300-3 of the access terminal 132 that shows demodulation and decoding of received channels is depicted. In this embodiment, three different methods can be used to choose the demodulator 304, 308, 312 to use. Different demodulators 304, 308, 312 can be deactivated with the enable signal. The demodulator selector 316 can choose from the remaining ones or not. Where there are adequate resources in the turbo decoder 320, the most likely to be used streams are decoded in the turbo decoder 320. The stream selector 324 chooses from any alternatives using a validity check.

An example can illustrate the interaction of the three different choosing methods. It could be determined that interference is unlikely such that the MMSE demodulator with IN 312 is deactivated. The MRC and MMSE demodulators 304, 308 produce a demodulated stream to the demodulator selector 316 who determines that adequate resources exist in the turbo decoder 320 such that no culling is performed by the demodulator selector 316. After turbo decoding, the stream selector may find that one or both pass the validity check. One that passed is chosen for use.

Figure 4A:
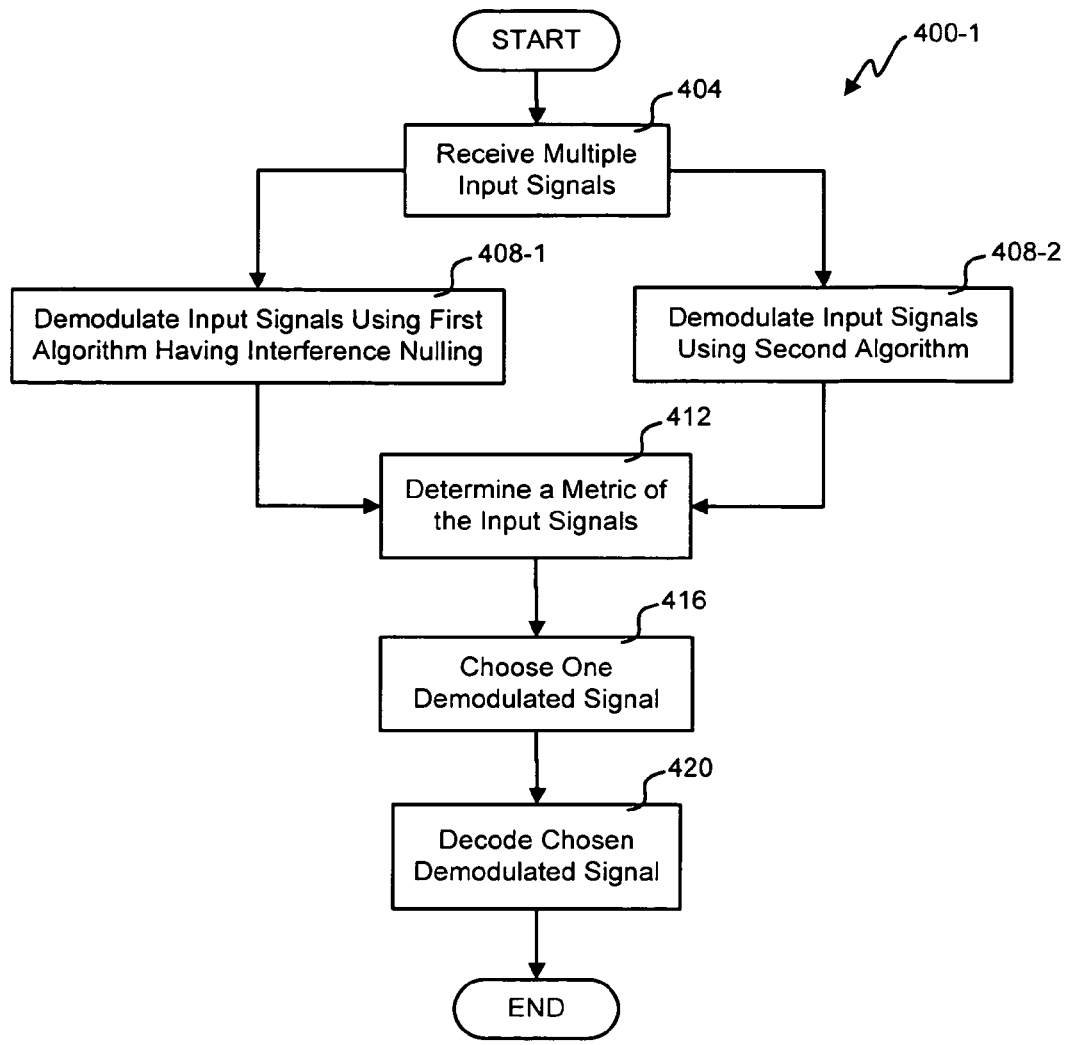
FIGS. 4A and 4B are flow diagrams that show embodiments of a process for demodulating and decoding one or more signals.

Referring next to FIG. 4A, the present disclosure provides an embodiment a method 400-1 for demodulating and decoding one or more communication signals that are received in block 404. The one or more communication signals are demodulated using a first algorithm in block 408-1, where the first algorithm includes interference nulling. The one or more communication signals are also demodulated using a second algorithm in block 408-2, which is different from the first algorithm. A decision is made between the first and second algorithms in block 416 based upon a metric determined in block 412 to produce a demodulated signal. The demodulated signal is decoded in block 420 to produce a decoded signal.

Figure 4B:
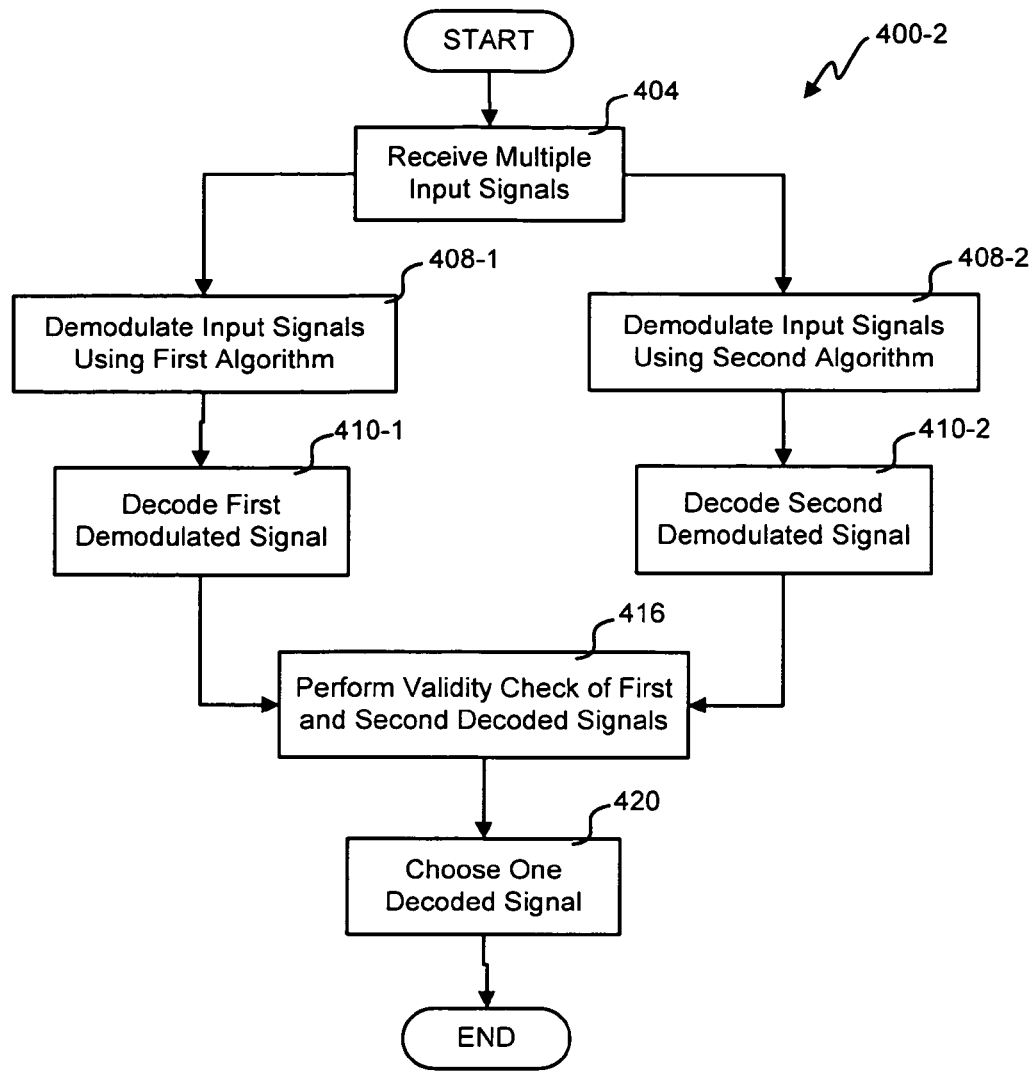

With reference to FIG. 4B, the present disclosure further discloses another embodiment of a method 400-2 for demodulating and decoding one or more communication signals received in block 404. The one or more communication signals is demodulated using a first algorithm to produce a first demodulated signal in block 408-1. The one or more communication signals is also demodulated using a second algorithm to produce a second demodulated signal in block 408-2, where the first algorithm is different from the second algorithm. The first demodulated signal is decoded to produce a first decoded signal in block 410-1, and the second demodulated signal is decoded to produce a second decoded signal in block 410-2. A decision is made in block 420 between the first and second decoded signal based upon validity checks of the first and second decoded signals in block 416.

Figure 5A:
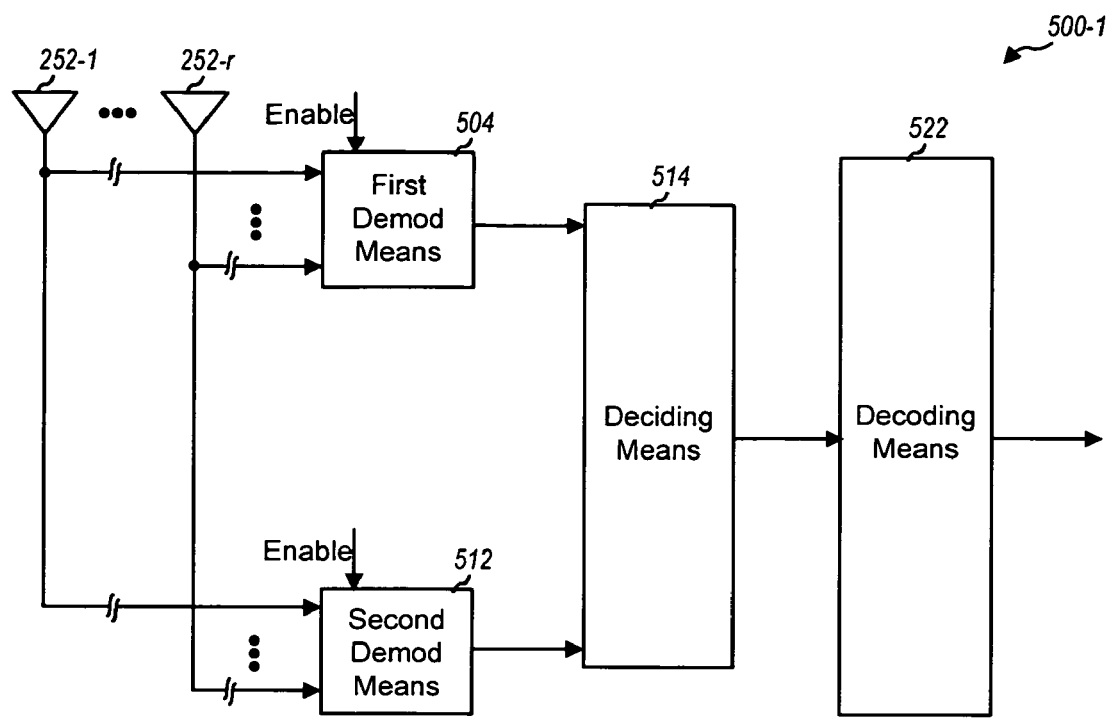
FIGS. 5A and 5B are block diagrams that show embodiments of means for demodulating and decoding one or more signals.

Referring next to FIG. 5A, a block diagram illustrates an embodiment of a multiple-input receiver 500-1 for demodulating and decoding one or more signals. The multiple-input receiver 500-1 includes first and second means for demodulating 504, 512, means for deciding 514, and means for decoding 522. The first means 504 demodulates the one or more communication signals using a first algorithm that uses interference nulling. The second means 512 demodulates the one or more communication signals using a second algorithm, which is different from the first algorithm. The means for deciding 514 chooses between the first and second algorithm based upon a metric to produce a demodulated signal. The means for decoding 522 the demodulated signal produces a decoded signal.

Figure 5B:
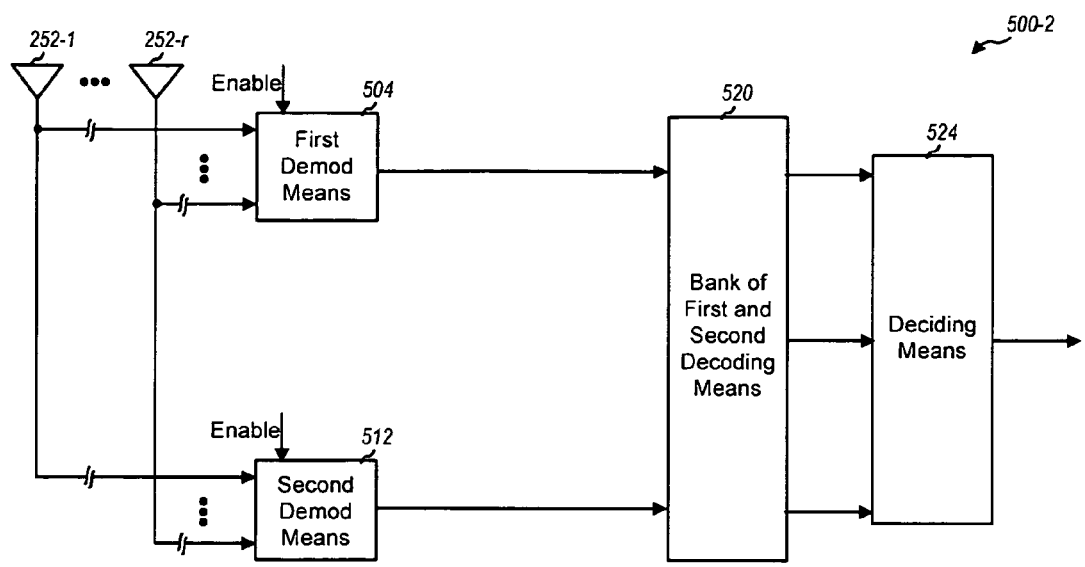

Referring next to FIG. 5B, a block diagram illustrates an embodiment of a multiple-input receiver 500-2 for demodulating and decoding one or more signals. The multiple-input receiver 500-2 includes first and second means for demodulating 504, 512, first and second means for decoding 520, and means for deciding 524. The first means for demodulating 504 the one or more communication signals uses a first algorithm to produce a first demodulated signal. The second means for demodulating 512 the one or more communication signals uses a second algorithm to produce a second demodulated signal, where the first algorithm is different from the second algorithm. The first means for decoding 520 the first demodulated signal produces a first decoded signal. The second means for decoding 520 the second demodulated signal produces a second decoded signal. The means for deciding 524 between the first and second decoded signal chooses based upon validity checks of the first and second decoded signals.

The techniques, blocks, steps and means described herein may be implemented by various means. For example, these techniques, blocks, steps and means may be implemented in hardware, software, or a combination thereof. For a hardware implementation, the processing units within an access point or an access terminal may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the techniques described herein may be implemented with instructions (e.g., procedures, functions, modules, and so on) that perform the functions described herein. The instructions may be stored in memory units, or other memory, and executed by processors. The memory may be implemented within the processor or external to the processor, in which case it can be communicatively coupled to the processor via various means as is known in the art.

While the principles of the disclosure have been described above in connection with specific apparatuses and methods, it is to be clearly understood that this description is made only by way of example and not as limitation on the scope of the disclosure.

What is claimed is:

1. A multiple-input receiver comprising:
    a first demodulator configured to use a first algorithm, including interference nulling;
    a second demodulator, wherein the second demodulator uses a second algorithm, which is different from the first algorithm;
    a decoder configured to be alternatively used with the first or second demodulator to decode one or more signals from the receiver;
    decision logic configured to choose the first demodulator or the second demodulator;
    wherein the decoding means comprises at least one algorithm comprising at least one of a convolutional algorithm or a turbo-decoding algorithm.

2. The multiple-input receiver as recited in claim 1, wherein the first and second algorithms are each respectively at least one of maximum ratio combining (MRC) demodulation or minimum mean squared error (MMSE) demodulation.

3. The multiple-input receiver as recited in claim 1, wherein the demodulator selector is further configured to determine a number of demodulated signals the decoder is able to receive and decode simultaneously, and choose at least one of the first modulator or one or more of the at least one other demodulator to demodulate the one or more communication signals and produce the one or more demodulated signals, based at least in part on a current amount of available resources of the decoder.

4. The multiple-input receiver as recited in claim 1, further comprising a plurality of antenna inputs, wherein one or more of the antenna inputs receive the one or more communication signals.

5. The multiple-input receiver as recited in claim 1, wherein the first demodulator uses the interference nulling to remove unwanted information from the one or more communication signals.

6. The multiple-input receiver as recited in claim 1, wherein the demodulator selector is configured to select based at least in part on a metric.

7. The multiple-input receiver as recited in claim 6, wherein the metric is a signal to interference-plus-noise ratio (SINR) for the first or modulator or the at least one other demodulator.

8. A multiple-input receiver comprising:
    first means for demodulating one or more communication signals using a first algorithm, wherein the first algorithm includes interference nulling;
    second means for demodulating the one or more communication signals using a second algorithm, which is different from the first algorithm;
    means for deciding between the first and second algorithm to produce a demodulated signal; and
    means for decoding the demodulated signal to produce a decoded signal, and
    means for selecting, by a stream selector, either a first decoded signal from the first demodulator or a second decoded signal from the second demodulator based at least in part on a validity test of a first subset of decoded bits of the first decoded signal and a second validity test of a second subset of decoded bits of the second decoded signal; and
    wherein the decoding uses at least one algorithm comprising at least one of a convolutional algorithm or a turbo-decoding algorithm.

9. The multiple-input receiver as recited in claim 8, wherein the at least one other algorithm is one of maximum ratio combining (MRC) demodulation or minimum mean squared error (MMSE) demodulation.

10. The multiple-input receiver as recited in claim 8, wherein the means for deciding comprises means for deciding based at least in part on a metric.

11. The multiple-input receiver as recited in claim 10, wherein the metric is a signal to interference-plus-noise ratio (SINR).

12. The multiple-input receiver as recited in claim 8, wherein the first algorithm includes a successive cancellation receiver processing technique.

13. The multiple-input receiver as recited in claim 8, wherein the validity check comprising at least one of cyclic redundancy check (CRC), parity check, or decryption error check.

14. A method for processing one or more communication signals, the method comprising:
    demodulating the one or more communication signals using a first algorithm, wherein the first algorithm includes interference nulling;
    demodulating the one or more communication signals using a second algorithm, which is different from the first algorithm;
    deciding between the first and second algorithm to produce a demodulated signal;
    decoding, by a decoder, the demodulated signal to produce a decoded signal;
    selecting, by a stream selector, either a first decoded signal from the first demodulator or a second decoded signal from the second demodulator based at least in part on a validity test of a first subset of decoded bits of the first decoded signal and a second validity test of a second subset of decoded bits of the second decoded signal; and
    a stream selector configured to select either a first decoded signal from the first demodulator or a second decoded signal from the second demodulator based at least in part on a validity test of a first subset of decoded bits of the first decoded signal and a second validity test of a second subset of decoded bits of the second decoded signal; and
    wherein the decoder uses at least one algorithm comprising at least one of a convolutional algorithm or a turbo-decoding algorithm.

15. The method for processing the one or more communication signals as recited in claim 14, further comprising determining to not demodulate the one or more communication signals using a third algorithm.

16. The method for processing the one or more communication signals as recited in claim 14, wherein the at least one other algorithm does not perform interference nulling.

17. The method for processing the one or more communication signals as recited in claim 14, wherein the first algorithm includes a successive cancellation receiver processing technique.

18. The method for processing the one or more communication signals as recited in claim 14, further comprising:
selecting one of the one or more decoded signals based at least in part on a validity check.

19. The method for processing the one or more communication signals as recited in claim 14, wherein deciding comprises deciding based at least in part on a metric.

20. The method for processing the one or more communication signals as recited in claim 19, wherein the metric is a signal to interference-plus-noise ratio (SINR).

21. A non-transitory processor readable medium having stored thereon computable executable comprising instructions thereon that may be utilized by one or more processors, the instructions comprising:
instructions for demodulating one or more communication signals using a first algorithm, wherein the first algorithm includes interference nulling;
instructions for demodulating the one or more communication signals using a second algorithm, which is different from the first algorithm;
instructions for deciding between the first and second algorithm based upon a metric to produce a demodulated signal;
instructions for decoding, by a decoder, the demodulated signal to produce a decoded signal;
instructions for selecting, by a stream selector, either a first decoded signal from the first demodulator or a second decoded signal from the second demodulator based at least in part on a validity test of a first subset of decoded bits of the first decoded signal and a second validity test of a second subset of decoded bits of the second decoded signal; and
wherein the decoder uses at least one algorithm comprising at least one of a convolutional algorithm or a turbo-decoding algorithm.

22. A non-transitory computer readable medium having stored thereon computer executable instructions for processing one or more communication signals, comprising:
instructions for demodulating the one or more communication signals using at least one of a first algorithm or at least one other algorithm, wherein the first algorithm includes interference nulling and the at least one other algorithm is different from the first algorithm;
instructions for deciding to utilize at least one of the first algorithm or one or more of at least one other algorithm to produce one or more demodulated signals, based at least in part on accuracy of an estimation of interference in relation to the first algorithm;
instructions for decoding, by a decoder, the one or more demodulated signals to produce one or more decoded signals;
instructions for selecting, by a stream selector, either a first decoded signal from the first demodulator or one of at least one other decoded signal from one of the at least one other demodulator based at least in part on a validity test of a first subset of decoded bits of the first decoded signal and at least one other validity test of at least one other subset of decoded bits of the at least one other decoded signal; and
wherein the decoder uses at least one algorithm comprising at least one of a convolutional algorithm or a turbo-decoding algorithm.

\* \* \* \* \*

UNITED STATES PATENT AND TRADEMARK OFFICE
CERTIFICATE OF CORRECTION

PATENT NO. : 8,223,904 B2
APPLICATION NO. : 11/501800
DATED : July 17, 2012
INVENTOR(S) : Hemanth Sampath It is certified that error appears in the above-identified patent and that said Letters Patent is hereby corrected as shown below:

In the Claims
In Column 9, delete lines 28-58, and replace with:
--a stream selector configured to select either a first decoded signal form the first demodulator or a second decoded signal from the second demodulator based at least in part on a validity test of a first subset of decoded bits of the first decoded signal and a second validity test of a second subset of decoded bits of the second decoded signal; and
wherein the decoder uses at least one algorithm comprising at least one of a convolutional algorithm and a turbo-decoding algorithm.
2. The multiple-input receiver as recited in claim 1, wherein the first and second algorithms are chosen from the group consisting of maximum ratio combining (MRC) demodulating and maximum mean squared error (MMSE) demodulating.
3. The multiple-input receiver as recited in claim 1, wherein the decoder is configured to use a turbo-decoding algorithm.
4. The multiple-input receiver as recited in claim 1, further comprising a plurality of antenna inputs that each receive the one or more communication signals.
5. The multiple-input receiver as recited in claim 1, wherein interference nulling is a process that removes unwanted interference from the one or more communication signals.
6. The multiple-input receiver as recited in claim 1, wherein the decision logic is configured to choose based upon a metric.
7. The multiple-input receiver as recited in claim 6, wherein the metric is a signal to interference-plus-noise ratio (SINR) for the first or second demodulator.--.

In Column 10, line 10 (in Claim 8), change "uses" to --means comprises--.

In Column 10, delete lines 13-19, and replace with:
--9. The multiple-input receiver as recited in claim 8, wherein the second algorithm is chosen from the group consisting of maximum ratio combining (MRC) demodulating and maximum mean squared error (MMSE) demodulating.

Signed and Sealed this
Nineteenth Day of January, 2016

Michelle K. Lee
*Director of the United States Patent and Trademark Office*

CERTIFICATE OF CORRECTION (continued)
U.S. Pat. No. 8,223,904 B2

10. The multiple-input receiver as recited in claim 8, wherein the means for deciding comprises means for deciding based upon a metric.--.

In Column 10, delete lines 26-29, and replace with:
--13. The multiple-input receiver as recited in claim 8, wherein means for deciding comprises means for deciding using a validity check.--.

In Column 10 (in Claim 14), delete lines 48-53; and line 54, change "decoder" to --decoding--.

In Column 10, delete lines 61-63, and replace with:
--16. The method for processing the one or more communication signals as recited in claim 14, wherein the second algorithm does not perform interference nulling.--.

In Column 11, delete lines 1-7 and replace with:
--18. The method for processing the one or more communication signals as recited in claim 14, wherein deciding comprises deciding using a validity check.
19. The method for processing the one or more communication signals as recited in claim 14, wherein deciding comprises deciding based upon a metric.--.

In Column 11, line 12 (in Claim 21), change "computable executable comprising" to --computer executable--.

In Column 11, line 13 (in Claim 21), delete "thereon".